United States Patent [19]

Cham et al.

[11] Patent Number: 4,633,296

[45] Date of Patent: Dec. 30, 1986

[54] OMISSION AND SUBSEQUENT ESTIMATION OF ZERO SEQUENCY COEFFICIENTS OF TRANSFORMED DIGITIZED IMAGES TO FACILITATE DATA COMPRESSION

[75] Inventors: Wai K. Cham, Loughborough; Roger J. Clarke, Burton on the Wolds; Richard C. Nicol, Ipswich, all of England

[73] Assignee: British Telecommunications public limited company, Great Britain

[21] Appl. No.: 541,932

[22] Filed: Oct. 14, 1983

[30] Foreign Application Priority Data

Oct. 14, 1982 [GB] United Kingdom ................ 8229420

[51] Int. Cl.⁴ ..................... H04N 5/16; H04N 11/02
[52] U.S. Cl. ................................. 358/12; 358/133; 358/138
[58] Field of Search ............. 358/133, 138, 12, 11, 358/21 R, 141; 364/725

[56] References Cited

U.S. PATENT DOCUMENTS

| | | | |
|---|---|---|---|
| 3,984,626 | 10/1976 | Mounts | 178/6 |
| 4,189,748 | 2/1980 | Reis | 358/133 |
| 4,281,344 | 7/1981 | Mounts | 358/136 |
| 4,504,860 | 3/1985 | Nicol et al. | 358/133 |
| 4,510,578 | 4/1985 | Miyaguchi | 358/138 |
| 4,517,597 | 5/1985 | Glenn | 358/138 |

FOREIGN PATENT DOCUMENTS 0072117 2/1983 European Pat. Off. .
2329124 5/1977 France .

OTHER PUBLICATIONS

Soft Decision Demodulator and Transform Coding of Images, R. C. Reiniger et al, IEEE International Conference on Communications, Conf. Record, vol. 2 of 3, Jun. 13–17, 1982, pp. 4H.3.1.–4H.3.6.
Lowpass Filtering in the Cosine Transform Domain—King Ngi Ngan, International Conference on Communications/Conference Record (ICC'80) vol. 2 of 3, Jun. 18–12, 1980, pp. 31.7.1–37.7.5.
A Real Time Video Bandwidth Reduction System Based on a CCD Hadamard Transform Device—D. J. Spencer, et al, Proc. IEEE 1979, National Aerospace & Electronics Conference NAECON 1979, vol. 3, May 15–17, 1979, pp. 1218–1231.
Channel Error Recovery for Transform Image Coding Mitchell et al, IEEE Trans on Comm, COM-29, 12, Dec. 1981, pp. 1754–1762.
Transmission Techniques for Picture Prestel—Nicol, et al, The Radio and Electronic Engineer, 51, 19, Oct. 1981, pp. 514–518.
Adaptive Coding of Monochrome and Colour Images—Chen et al, IEEE Trans on Comm, COM-25, 11 Nov. 1977, pp. 1285–1292.

*Primary Examiner*—Michael A. Masinick
*Attorney, Agent, or Firm*—Nixon & Vanderhye

[57] ABSTRACT

A method of transmission or storage of a television picture involves dividing it into a plurality of blocks, subjecting them individually to a two-dimensional unitary transformation, transmitting or storing the transform coefficients and reconstructing the original blocks by the use of the inverse transformation. To reduce the data rate, the zero sequency coefficient is omitted for most or all the blocks, and the mean levels of the reconstructed blocks are adjusted to reduce visible brightness changes between them. The adjustment may be made to reduce the means square differences between the elements in two blocks along the common boundary. The division into blocks may give common elements in two blocks along each inter-block boundary. If a picture transition coincides with a block division an indication of this may be sent so that differences between elements along the division are ignored.

24 Claims, 4 Drawing Figures

```
8  4  3  2  2  1  1  0
4  3  3  2  2  1  0  0
3  3  2  2  1  0  0  0
2  2  2  1  1  0  0  0
2  2  1  1  0  0  0  0
1  1  0  0  0  0  0  0
1  0  0  0  0  0  0  0
0  0  0  0  0  0  0  0
```

OMISSION AND SUBSEQUENT ESTIMATION OF ZERO SEQUENCY COEFFICIENTS OF TRANSFORMED DIGITIZED IMAGES TO FACILITATE DATA COMPRESSION

This invention relates to the transmission of images in digital form. The invention may be used to reduce the amount of data which is required to be transmitted to convey an image at a given resolution.

It is known to produce a video signal representing an image by scanning it to produce a signal similar to that used for television, and it is also known to sample the video signal and to convert the samples into digital form so that each picture element (PEL) corresponding to a sample of the video signal is represented by a plurality of binary digits representing the brightness of the particular element or the intensity of a particular colour component of that element. Such a method of transmission might be made more efficient by the use of non-linear quantisation of the samples so that a better reproduction of the image is obtained for a given number of bits in the digital coding of each sample than would be obtained if a uniform coding were employed.

As an image contains a large amount of data, it is desirable to reduce as far as possible the amount of data needed to transmit an image. Straightforward digital transmission of an image as described above suffers from the disadvantages that a reduction of the amount of data representing the image will detract markedly from the quality of the reproduced image. In order to overcome this difficulty it has been proposed to convert the digital video signal into a transformed signal in which the coded samples are subjected to a two-dimensional unitary transformation, and then reduce the transformed data. At the receiver the transformed signal is subjected to the inverse transform to regenerate the original image. When transmitted in this way, the data reduction does not result in degradation of the image which is as objectionable subjectively as the same data reduction on the image data itself would be.

According to the present invention there is provided a method of transmitting or storing an image including producing an array of samples representing the picture elements of an array of such elements representing an original image, notionally dividing the array of picture elements into a plurality of blocks, for each block subjecting the array of samples to a two-dimensional transformation, transmitting or storing representations of at least some of the coefficients, subjecting the received coefficients in each transformed block to the inverse of the original two-dimensional transformation to produce a block of restored samples and reproducing an image from the adjusted blocks, characterised in that for each of at least some of the blocks representations of the zero sequency coefficient are not transmitted or, as the case may be, stored, and values for the mean levels of the restored blocks are calculated so as to substantially minimise visible brightness and/or in a colour system, colour changes between the particular block and at least one of the neighbouring blocks.

Normally, a unitary transformation, such as the Hadamard or Discrete Cosine transform would be used. The adjustment of the mean levels of the restored blocks may be carried out so as to minimise the mean square value of the brightness differences between the nearest adjacent elements in different blocks at the boundaries between the blocks. This manner of adjustment is satisfactory if no edges in the image coincide with block boundaries, but it can give erroneous results if there is a substantial brightness change in the image lying on a transition between blocks. This difficulty can be overcome by measuring the mean square brightness difference at each edge between blocks of the original image before transformation and sending an indication if the difference exceeds a threshold value so that the adjustment of the mean levels for adjacent blocks can be arranged to ignore brightness differences at such edges.

To take a practical example, suppose that the original image has $256 \times 256$ elements and each block is of $8 \times 8$ elements. It follows that for the whole image there are 1024 blocks. The calculations required to minimise the mean square difference for the whole image at once are too lengthy for execution in a reasonable period of time, and therefore it is proposed that the mean level of one block, e.g. that in the top left-hand corner, is set to an arbitrary value, but one that is likely to be reasonable, and those of the other blocks are taken one at a time in sequence are calculated so as to minimise the mean square differences at the one or two edges which each block shares with blocks whose mean level has already been calculated, they may all be subjected to an additive correction by the same amount to bring the average grey level of the entire reproduced image within a desired range.

Instead of calculating the mean level of each block separately, as described above, the mean levels of a row (or column) of blocks may be calculated in that way and then the blocks dealt with a row (or column) at a time. Yet another way would be to amalgamate the blocks into groups of four arranged in a square, adjusting the relative mean levels to minimise the mean square differences along the four edges shared by the blocks of the group, then to amalgamate those groups into larger groups (of four groups) using the same technique, and so on until all of the blocks are amalgamated together. As before an overall additive correction may be made to adjust the grey level of the entire image.

The invention permits a reduction in the amount of data needed to be transmitted (or stored) by omitting from the data transmitted the d.c. coefficient of all or many of the blocks. Since this coefficient is the one normally transmitted with the greatest accuracy its omission will result in a greater reduction in the data to be transmitted than would be the omission of any other coefficient. If the d.c. coefficient determining the mean level of one block is transmitted, this block could be used as a reference to which the mean levels of all of the remaining blocks are related directly or indirectly; if the image is such that substantial errors could arise in the mean levels of the other blocks it may be desirable to transmit the d.c. coefficients determining the mean levels of more than one block, e.g. a row or column, or possibly of a few blocks distributed throughout the image area, limiting the extent to which the effect of transmission errors can "propagate" through the image during the reconstruction process.

When the relative adjustment of the mean levels has been effected on the basis of an arbitrarily chosen value in one block selected as reference, the mean levels of all of the blocks may be subjected to a common additive correction to produce a mean grey level within a given range for the entire image.

If the d.c. coefficient of a single block is transmitted or stored to provide, when decoded, a reference for the whole image as described above, it may still be desirable to adjust the mean levels to give a mean grey level within a given range for the image, although, in theory at least, such adjustment ought not to be necessary.

Some embodiments of the invention will now be described with reference to the accompanying drawings, in which.

Figures 1, 2:
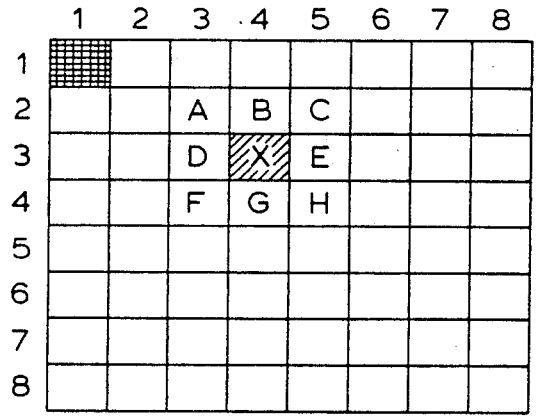
FIG. 1 illustrates the division of an image into blocks.
FIG. 2 shows an example of the numbers of bits allocated to each coefficient of a transformed 8×8 block.

In FIG. 1, an image is shown as being divided into 64 blocks, each composed of 64 picture elements (pels). It is assumed that the number of pels in both horizontal and vertical directions is the same. As a practical example, it is likely that an image of, say, 256×256 PELs might be divided into 1024 8×8 blocks.

The image is converted into a video signal, and sampled. Each 8×8 array of samples corresponding to a block is subjected to a two-dimensional unitary transformation.

It is impractical to transform the entire image in a reasonable time because the calculation involved in producing the transforms of images having over 65,000 PELs are at present too lengthy even for the fastest computing techniques. Division of the image into smaller blocks, for example, consisting of 8×8 PELs means that the computations involved are simplified by a factor of 1,000 and can be executed in a reasonable time by present computing techniques and hardware. Suitable transforms are the Discrete Cosine Transform or the Hadamard transform, for example. The transformation produces an 8×8 array of coefficients (in general, an N×M sample array produces an N×M array of coefficients, although it is common to discard—or not calculate—the higher sequency coefficients). The sequency in a given direction is the number of sign changes in the corresponding row or column of the basis matrix of the transform used.

FIG. 2 shows the number of bits which, in a conventional system, would typically be allocated to coefficients of a transformed block of the image for transmission of that image in the transformed state, ordered as to sequency; thus the top left term indicates that 8 bits are allocated to the zero sequency term, whilst the right hand column and bottom row correspond to the highest sequency coefficient in the two directions.

Considering the block X shown in FIG. 1, this block is surrounded by eight blocks A, B, C, D, E, F, G and H, and the invention makes use of the fact that the lines of PELs of the block X adjacent its four edges will be similar in most cases to the lines of PELs of the blocks B, D, E and G adjacent the same edges. This will not be true if a discontinuity in the image separating areas of differing brightness lies along one of the boundary edges of the block X and a method of taking this into consideration is described below.

From a consideration of FIG. 2, it will be clear that the zero-sequency, or "d.c.", coefficient at the top left-hand corner, which represents the average brightness level of the whole block, is normally conveyed by more bits than the other coefficients. However, if the d.c. coefficient is discarded the amount of data needed to be transmitted to convey the transformed block is reduced by one-eighth, or possibly more depending on the block size, bit allocation and transformation used. The varying detail of the part of the image within a block is conveyed by the other coefficients so that the discarding of the d.c. coefficients does not affect the detail conveyed. However, the discarding of the d.c. coefficient does give rise to the difficulty that the mean brightness levels of the blocks will not automatically have the correct values when the image is reproduced by the inverse transformation and the sharp brightness changes at the edges of the blocks will then be objectionable. It is proposed therefore to adjust the mean levels of the blocks of the reproduced image by comparing the lines of PELs belonging to adjacent blocks on each side of an edge and adjusting the mean levels so as to reduce the differences. If, for example, the d.c. coefficient of the top left-hand block of the image is transmitted, then the mean levels of the adjacent blocks of the reproduced image can be derived from that transmitted d.c. coefficient by choosing mean levels which minimise the mean square value of the brightness differences between the adjacent lines of PELs at the edges between the blocks. In this way it is possible to build up the mean levels of all the blocks by reference to the one block of which the d.c. coefficient was transmitted.

Three alternative methods of building up the mean levels of the blocks over the entire image are possible, and in the following description it is assumed that the mean level of the top left-hand block, (1,1), is either transmitted or is set to zero or some other arbitrary value. In the latter case, then an overall adjustment of the mean levels of all of the blocks by the same amount may be made at the end to bring the overall brightness level to a satisfactory value.

In a first method of building up the mean levels, the levels of the blocks along the top edge of the image are worked out in sequence and then the blocks down the left-hand edge. After that the remainder of the blocks are dealt with individually by reference to the differences along both of the edges which each block shares with two blocks whose mean levels are already calculated. A second way in which the mean levels may be built up is to determine those of the blocks in the first row as described above and then to build up each subsequent row of blocks so as to minimise the edge differences both between the blocks of the row and between them and the blocks of the preceding row. The third way is to combine the blocks into sets of four and adjust the relative levels of the blocks within each set, so as to produce a set of blocks of twice the linear dimension of the original blocks and then to combine the larger blocks into four again and so on until the entire image has been processed.

Figure 3:
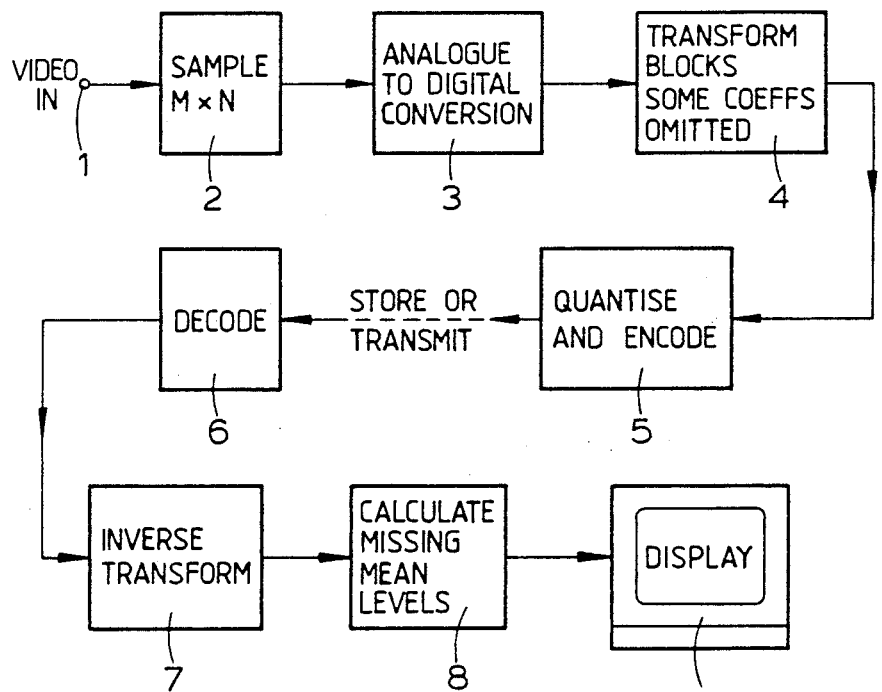
FIG. 3 is a block diagram of one example of an image transmission system using a method according to the invention.

FIG. 3 shows in block diagrammatic form one example of a transmission system using a method of transmitting an image according to the invention. In FIG. 3, a video signal is applied via a terminal 1 to a sampling circuit 2 from which the sampled analogue values are applied to an analogue/digital converter 3 which preferably includes some form of non-linear quantisation to optimise the encoding to digital form. The digital values are then applied to unit 4 which applies to the values in blocks corresponding to the blocks of the image a two-dimensional unitary transformation such as, for example, a discrete cosine transformation or a Hadamard transformation. At this stage the d.c. coefficients of most of the blocks, or possibly all of them, are not generated. The remaining coefficients are subjected to quantisation and encoding in a unit 5 as required for transmission or storage. The encoding arrangements could be, for example, constructed as described in our co-pending European patent application no. 82303825 (Ser. No. 0072117) corresponding to U.S. Pat. No. 4,504,860 of Nicol et al (which issued on Mar. 12, 1985) the only difference being that the zero sequency coefficients are not calculated; or at least, not transmitted.

The stored or transmitted data is subsequently received by a decoder 6 which decodes the received data to reproduce the quantised values of the coefficients and the coefficients so obtained are grouped together into their blocks and subjected to the inverse transform to that applied by the unit 4; this inverse transform is effected by the unit 7. The decoding process is, thus far, conventional, except that zero is assumed for the missing zero sequency coefficients. Thereafter the missing mean values are calculated as described above, so that discontinuities in the mean values do not appear at the block boundaries. Finally, the regenerated image information is passed to a utilisation means 9 which may, for example, be a display device. Although the stages in the manipulation of the data are shown separately in FIG. 3, they may in fact be effected by means of suitable computing means instead of by units dedicated to the separate operations.

Figure 4:
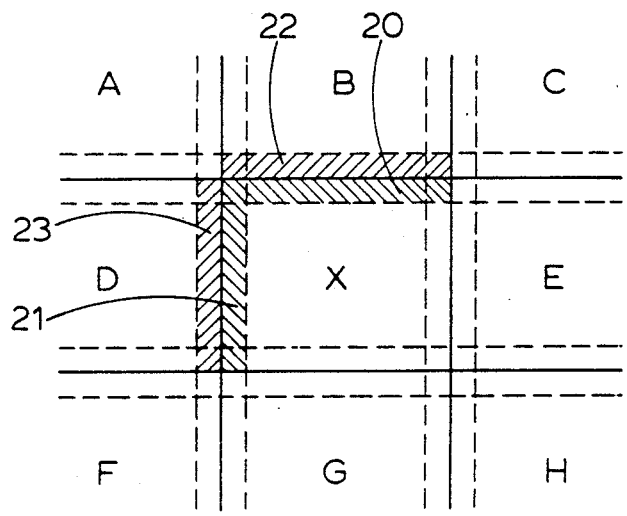
FIG. 4 is a diagram to be used to help to describe a method according to the invention.

FIG. 4 shows the nine blocks A to H and X of FIG. 1 with the rows of PELs of the block X adjacent to the edges shared with the blocks B and D indicated respectively by references 20 and 21. Adjacent to the row 20, there is in the block B, whose mean value is already known, a row 22 of PELs adjacent to the common edge with the block X. In the block D whose mean value is already known also a row 23 of PELs adjacent to the common edge with the block X is marked. If the values of the PELs in the row 22 are given by $y_i$ for $i=1, 2, 3, \ldots, n$, where n is the number of PELs in the row, and $x_i$ for $i=1, 2, 3, \ldots, n$ represents the values of the elements of the row 20 in the block X whose mean level $x'$ is to be calculated, then what is required for the mean value of the block X is a value of $x'$ such that $$\sum_1^n [y_i - (x_i + x')]^2$$

should be a minimum. It can be shown that to achieve this what is required is that $$x' = \left( \sum_1^n y_i - \sum_1^n x_i \right) / n$$

If the differences between the PELs and the rows 21 and 23 were also to be taken into consideration in calculating the d.c. value of the block X, then the calculation above would be modified by the addition of the values of the PELs in the rows 21 and 23 to the expressions. Thus if $u_i$ and $v_i$ are the edge elements of rows 21 and 23 respectively:

$$x' = \left( \sum_1^n y_i - \sum_1^n x_i + \sum_1^n v_i - \sum_1^n u_i \right) / 2n$$

This corresponds to the first of the three methods outlined above ("row estimation").

In the second method (row estimation), for each row after the first the set of d.c. coefficients is found which minimizes the sum of the square magnitudes of the edge difference vectors between that row and the previous row, and also those between the individual blocks in that row. The method of estimation of the d.c. coefficients in the ith row from those in the i−1th row is now given. It is assumed that the receiver has the following information:

(i) $[u(k,l)]_{i,j}$: the (i,j)th block of pels having zero d.c. level.

(ii) $[v(k,l)]_{i-1,j}$: the (i−1,j)th block of pels whose d.c. level have been adjusted according to the estimated d.c. coefficients.

$$[v(k,l)]_{i-1,j} = [u(k,l)]_{i-1,j} + b_{i-1,j} \times V \times V^t$$

where $b_{i-1,j}$ is the estimated d.c. coefficient for block (i−1,j) and $V = [1/n \ldots 1/n]^t$.

Now we are to estimate the N-dimensional d.c. coefficient vector $$A = [a_1, \ldots, a_N]$$

from $[u(k,l)]_{i,j}$ and $[v(k,l)]_{i-1,j}$. We define vertical and horizontal edge difference vectors for block (i,j) as shown in FIG. 2.

The vertical edge difference vector between the jth block and j+1th block in the ith row of blocks is $$D_{1,j} = \begin{bmatrix} u(1,n)_{i,j} - u(1,1)_{i,j+1} \\ u(2,n)_{i,j} - u(2,1)_{i,j+1} \\ \ldots \quad \ldots \\ U(n,n)_{i,j} - u(n,1)_{i,j+1} \end{bmatrix} \quad j \in [1, N-1]$$

The horizontal edge difference vector between the (i−1,j)th block and (i,j)th block is $$D_{2,j} = \begin{bmatrix} u(n,1)_{i,j} - v(1,1)_{i-1,j} \\ u(n,2)_{i,j} - v(1,2)_{i-1,j} \\ \ldots \quad \ldots \\ u(n,n)_{i,j} - v(1,n)_{i-1,j} \end{bmatrix} \quad j \in [1, N]$$

If the pels in the ith row are adjusted by the N d.c coefficients $a_1, a_2, a_3, \ldots, a_N$, then the edge difference vectors $D_{1,j}$ and $D_{2,j}$ are changed to $W_{1,j}$ and $W_{2,j}$ respectively:

$$W_{1,j} = D_{1,j} + (a_j - a_{j+1}) \times V$$

$$W_{2,j} = D_{2,j} + a_j \times V$$

Therefore, the sum of the squares of the magnitudes of these edge difference vectors becomes $$e = \sum_{j=1}^{N-1} |D_{1,j} + (a_j - a_{j+1}) \times V|^2 + \sum_{j=1}^{N} |D_{2,j} + a_j \times V|^2$$

Rewriting in the form of $$e = \sum_{p=1}^{2} \sum_{j=1}^{N} |D_{p,j} + [R]_{p,j} \times A|^2$$

it can be shown that e is minimum when $$A = -[RR]^{-1} \times C$$

where $$[RR] = \sum_{p=1}^{2} \sum_{j=1}^{N} [R]_{p,j}^{t} \times [R]_{p,j} =$$

$$(1/n) \times \begin{bmatrix} 2 & -1 & 0 & & & & & \\ -1 & 3 & -1 & 0 & & & & \\ 0 & -1 & 3 & -1 & 0 & & & \\ & 0 & -1 & 3 & -1 & 0 & & \\ & & \cdot & \cdot & \cdot & \cdot & & \\ & & & & 0 & -1 & 3 & -1 & 0 \\ & & & & & 0 & -1 & 3 & -1 \\ & & & & & & 0 & -1 & 2 \end{bmatrix}$$

and $$C = \sum_{p=1}^{2} \sum_{j=1}^{N} [R]_{p,j}^{t} \times D_{p,j}$$

The evaluation of the restoration schemes was carried out experimentally using computer simulation. The head and shoulder picture of a girl was first divided into blocks of size n by n. Each block was then transformed using the Walsh/Hadamard transform, and the d.c. coefficient set equal to zero. All blocks were then inverse transformed to return to the picture domain. The three d.c. coefficient restoration schemes were then applied to obtain the restored pictures as well as the sets of estimated d.c. coefficients. These procedures were repeated for block sizes 4×4, 8×8 and 16×16. No coefficient quantization was undertaken.

With a 4×4 block size, there were edging effects in all the three restored pictures. Furthermore, the accumulation of error due to each estimation produced impairment effects along the direction of estimation. In the picture restored by element estimation, if a block was very bright or very dark, this brightness or darkness tended to diffuse diagonally from top to bottom right. In the picture restored by row estimation, the diffusion runs vertically from top to bottom and is less severe than that occurring with element estimation. In contrast, the picture restored by the third method (plane estimation) did not exhibit this effect. However, accumulation of estimation errors makes the edging effects more prominent as the block size increases.

With the 8×8 block size, pictures restored by element and row estimation still had edging effects but no apparent diffusion effect. Noticeable edging effects still remained in the picture restored using plane estimation. Using a block size 16×16, row estimation restored the picture without perceptible error whilst element estimation produced a reasonably good picture. Again, there were noticeable edging effects in the picture restored by plane estimation.

As mentioned above, the calculations assume that no severe luminance discontinuities appear in the image coincident with the edges between the blocks. If such discontinuities exist, they could be detected when the blocks are first formed before the transformation is carried out and an indication could be transmitted with the transform coefficients for a block to indicate that the differences between the PELs along one edge and those of the adjacent block should be ignored because the image has a boundary at that place. A single such transition will not obstruct the "building up" processes discussed above, but two such transitions on a given block may do so in instances where the building up process used (eg the first of the three described) relies upon the boundaries with two adjacent block to evaluate the mean level of the block in question. This situation may be met by providing that the d.c. coefficient be transmitted in respect of the two blocks whose common boundary coincides with the luminance discontinuity; either in every case, or in those cases where a problem is recognised on the basis of an appropriate criterion—eg the occurrence of two discontinuities. The actual criterion used would depend on the degree of sophistication of the building-up process; for example the number of occasions on which transmission of the d.c. term was required would be less if one employed a building-up process which could approach the block in question in two directions.

The correction of differences between PELs along the edges of blocks can also be effected by arranging that all of the blocks overlap the adjacent blocks by one row or column of elements so that the blocks of restored samples after inverse transform has been applied will have samples in common with the adjacent blocks and the relative adjustment of the mean levels of the blocks can be achieved simply because the common samples should have the same values in both blocks. There is no value in using this technique solely to permit d.c. term regeneration, since the redundancy would nullify the advantage obtained in reducing the amount of data needed to be transmitted to convey an image using the present invention; however, if the overlap technique is in any event used to counteract the "blocking" effect of omission of coarse quantisation of the higher sequency coefficients, it provides a ready aid to reconstruction of the omitted d.c. term.

The Hadamard transformation represents something of a special case, since its low sequency coefficients define the mean levels of sub-blocks within the block under consideration. For example, if $c_{ij}$ are the transform coefficients of a 16×16 block of PELs (i, j=1 to 16), ordered as to sequency, and $m_{p,q}$ are the mean values of four 8×8 sub blocks, then $c_{1,1}$ (the "d.c." term), $c_{1,2}$, $c_{2,1}$ and $c_{1,2}$ are linear combinations of $m_{1,1}$, $m_{1,2}$, $m_{2,1}$ and $m_{2,2}$. In fact $$\begin{bmatrix} c_{11} & c_{12} \\ c_{21} & c_{22} \end{bmatrix} = \begin{bmatrix} 1 & 1 \\ 1 & -1 \end{bmatrix} \begin{bmatrix} m_{11} & m_{12} \\ m_{21} & m_{22} \end{bmatrix} \begin{bmatrix} 1 & 1 \\ 1 & -1 \end{bmatrix}$$

Thus the omission of the first four coefficients of the coefficient array of the larger block has precisely the same effect as the omission of the lowest sequency coefficients of the smaller blocks, i.e. loss of the mean level information for the smaller blocks, and these can be restored on a (smaller) block by (smaller) block basis exactly as described above.

In the transmission of image data in the form of transform coefficients, it has been proposed to use different block sizes depending upon the activity within the image and this technique could be used in conjunction with the present invention.

Although the above description has assumed a single array of samples per image, obviously the same techniques could be applied to the components (RGB or luminance/colour difference) of a colour image.

The technique of the present invention does not necessarily require all the coefficients for all the blocks to be received before the d.c. coefficient restoration process can be initiated. It can also be used with the "slow" inverse transformation, described in our earlier European patent application mentioned above, in which the definition is gradually increased as more coefficients are inverse transformed and added to the previous result. When using the "slow" method the estimates of the d.c. coefficients are also continually updated as the intensity levels at the block boundaries change.

We claim:

1. A method of processing an array of picture elements of an image comprising the steps of:
    (1) producing an array of samples representing the picture elements of said picture element array,
    (2) subjecting sub-arrays of said sample array corresponding to blocks of said image to a two-dimensional transformation to produce associated sets of coefficients,
    (3) removing the zero sequency coefficients from at least some of said sets of coefficients to produce corresponding reduced sets of coefficients,
    (4) subjecting the reduced sets of coefficients corresponding to each block to the inverse of said two-dimensional transformation to produce sub-arrays of restored samples,
    (5) reproducing said image from the restored samples, and
    (6) calculating values for the mean levels of the blocks of the reproduced image so as to minimize visible brightness and/or colour changes between adjacent blocks of said reproduced image.

2. A method according to claim 1 wherein said calculating step (6) includes the step of adjusting the means levels of the blocks of the reproduced image to minimize the mean square value of the differences between the sample values of the nearest adjacent elements in different adjacent blocks along at least one of the boundaries between the blocks.

3. A method according to claim 2 wherein said calculating step (6) includes the steps of adjusting the mean levels of the blocks of the reproduced image for one block at a time, starting from a block in respect of which the zero sequency coefficient is not removed, and/or of which the mean level is set to an arbitrary value, and processing the blocks of said reproduced image in a sequence so that each block of which the mean level is being adjusted at any time borders on at least one block of which the mean level has already been determined.

4. A method according to claim 2 wherein said calculating step (6) further includes the step of adjusting the mean levels of the blocks of the reproduced image for one block at a time until a row or column of blocks is completed, and thereafter adjusting each row and/or column of blocks so as to minimize brightness/colour differences both between the blocks within it and between said row and/or column of blocks and previously processed row and/or column blocks.

5. A method according to claim 2 wherein said calculating step (6) includes the steps of progressively adjusting the mean levels of the blocks of the reproduced image so as to determine the relative mean levels of the blocks of a group of four mutually contiguous blocks, and progressively determining the mean levels of the groups of a larger group formed of four mutually contiguous groups, until the mean levels of all blocks have been adjusted.

6. A method according to claim 3, 4 or 5 wherein said method further includes the step of producing indications of the mean square values of the differences between the sample values corresponding to nearest adjacent picture elements in different blocks along the different boundaries between blocks of the first-mentioned image, and said calculating step (6) includes the steps of processing said indications of said boundary mean square values having calculated values exceeding a threshold value associated with the representations of the sets of coefficients, and adjusting the mean levels of the reproduced image blocks without permitting brightness differences between elements along such boundaries to affect said reproduced image.

7. A method according to claim 1 wherein said removing step (3) includes the step of removing all of the zero sequency coefficients, and said method further includes the step, performed subsequently to said calculating step (6), of subjecting the mean levels of all of said reproduced image blocks to an additive correction of the same amount so as to bring the average grey level of the entire reproduced image within a desired range.

8. A method according to claim 1 wherein said removing step (3) includes the step of retaining, in said sets of coefficients, the zero sequency coefficients only in respect of one row and/or column of blocks of said first-mentioned image.

9. A method of processing an image comprising:
    (1) producing an array of samples representing the picture elements of an array of such elements representing an original image;
    (2) subjecting the array of samples to a two-dimensional Hadamard transformation to produce a set of coefficients;
    (3) removing the zero and first order sequency coefficients from said set of coefficients to obtain a further set of coefficients;
    (4) subjecting the further set of coefficients to an inverse Hadamard transformation to produce an array of restored samples; and
    (5) reproducing an image from the restored samples; wherein said subjecting step (5) includes the step of estimating values of the coefficients removed by said removing step (3) to be used in the inverse transformation so as to substantially minimize visible brightness changes across at least some of the boundaries between blocks of the reproduced image which correspond to the removed coefficients.

10. An apparatus for reproducing an image comprising:
    inverse transforming means, connected to receive a set of coefficients representing a two-dimensional transformation of arrays of samples, said arrays of samples corresponding to blocks of an image, said set of coefficients not including zero sequency coefficients associated with said blocks, said transforming means for subjecting the set of coefficients corresponding to each block to the inverse of said two-dimensional transformation to produce an array of restored samples;
    means, connected to said inverse transforming means, for calculating values for the mean levels of the restored blocks so as to substantially minimize visible brightness and/or colour changes between adjacent blocks, the calculating means calculating estimates of the mean levels of blocks, including blocks which are adjacent only to blocks for which the zero sequency coefficient is not included in said set of coefficients; and
    means connected to said calculating means for reproducing an image in response to said calculated values.

11. An apparatus according to claim 10 characterized in that the calculating means also adjusts the mean levels of the restored blocks so as to minimizes the mean square value of the differences between the sample values of the nearest adjacent elements in adjacent blocks along at least one of the boundaries between the adjacent blocks.

12. An apparatus according to claim 10 characterized in that the calculating means successively adjusts the mean levels the blocks of the reproduced image, one block at a time, starting from a block in respect of which the zero sequency coefficient is included in said set of coefficiencies and/or the mean level of which is set to an arbitrary value, said calculating means adjusting the mean levels of the blocks in a sequence so that the calculating means processes blocks bordering on at least one block of which the mean level has already been determined.

13. An apparatus according to claim 10 characterized in that the calculating means adjusts the mean levels of the blocks of the reproduced image one block at a time until a row and/or column of blocks is completed, and thereafter adjusts additional rows and/or columns of blocks to minimize brightness/color differences both between the blocks within said row/column and between the row/column or blocks and the blocks within a previously-adjusted row/column.

14. An apparatus according to claim 10 characterized in that the calculating means adjusts the mean levels of the blocks of the reproduced image, determines the relative mean levels of the blocks of a group of four mutually contiguous blocks, and then progressively determines the mean levels of the groups of a larger group formed of four mutually contiguous groups until all blocks have been adjusted.

15. An apparatus according to claim 10 characterized in that the calculating means is also connected to receive indications identifying boundaries between blocks of the image in respect of which the mean square values of the differences between the sample values of the nearest adjacent elements in different blocks exceed a threshold value, and does not permit brightness/color differences between elements along such identified boundaries to affect adjustment of the mean levels of the restored blocks.

16. An apparatus according to claim 10 further including adjusting means, connected to receive the adjusted mean levels of all of the blocks of the reproduced image, for subjecting all said adjusted mean levels to an additive correction of the same amount so as to bring the average grey level of the entire reproduced image within a desired range.

17. A method of processing an image comprising the steps of:
(1) transforming sub-arrays of an array of values representing a two-dimensional image with a predetermined two-dimensional transformation to obtain plural sets of coefficients representing corresponding discrete areas of said image, said transforming step including the step of omitting the d.c. coefficients from said sets;
(2) transforming said plural sets of coefficients using the inverse of said two-dimensional transformation to produce plural restored sub-arrays of values representing corresponding discrete areas of said image;
(3) adjusting values of said plural restored sub-arrays to minimize the differences in the mean luminance and/or chrominance of adjacent discrete image areas represented by said restored sub-arrays; and
(4) generating an image in response to said adjusted restored sub-arrays.

18. A method as in claim 17 wherein said adjusting step (3) includes the steps of:
comparing mean values of restored sub-array values representing adjacent lines of said image; and
adjusting said restored sub-array values to minimize the differences between said compared mean values.

19. A method as in claim 17 wherein:
said transforming step (1) includes the step of producing the d.c. coefficients corresponding to one of said discrete areas of said image; and
said adjusting step (3) includes the step of referencing said restored sub-array values to said d.c. coefficients produced by said d.c. coefficient producing step.

20. A method as in claim 17 wherein said adjusting step (3) includes the step of progressively combining smaller restored sub-arrays to obtain larger sub-arrays, and adjusting the values of said larger sub-arrays in response to the adjusted values of said smaller sub-arrays and in response to the mean values of adjacent larger sub-arrays.

21. A system for processing an image comprising:
means for defining an array of values representing a two-dimensional image;
transforming means, connected to receive said array of values, for transforming said array with a predetermined two-dimensional transformation to obtain plural sets of coefficients representing corresponding discrete areas of said image while omitting the d.c. coefficients of each set;
inverse transforming means, connected to receive said plural sets of coefficients, for transforming said plural sets of coefficients using the inverse of said predetermined two-dimensional transformation to produce plural corresponding restored sub-arrays of values representing corresponding discrete areas of said image;
means connected to said inverse transforming means for adjusting the values of said plural restored sub-arrays to minimize differences in the mean luminance and/or chrominance of adjacent image areas represented by said restored sub-arrays; and
display means connected to said adjusting means for displaying an image in response to said adjusted restored sub-arrays.

22. A system as in claim 21 wherein said adjusting means compares mean values of restored sub-array values representing adjacent lines of said image, and adjusts said restored sub-array values to minimize the difference between said compared mean values.

23. A system as in claim 21 wherein:
said transforming means produces the d.c. coefficients associated with one discrete area of said image; and
said adjusting means references said adjusted restored sub-array values to said d.c. coefficients produced by said transforming means.

24. A system as in claim 21 wherein said adjusting means progressively combines smaller restored sub-arrays to obtain larger sub-arrays, and adjusts the values of said larger sub-arrays in response to the adjusted values of said smaller sub-arrays and also in response to the mean values of adjacent larger sub-arrays.

* * * * *